(12) United States Patent
Jayaraman et al.

(10) Patent No.: US 9,092,146 B2
(45) Date of Patent: Jul. 28, 2015

(54) DYNAMICALLY VARYING TRANSFER SIZE IN A STORAGE DEVICE FOR IMPROVED PERFORMANCE

(71) Applicant: International Business Machines Corporation, Armonk, NY (US)

(72) Inventors: Prasanna Jayaraman, Karnataka (IN); Abhijit Saurabh, Pune (IN); M. Dean Sciacca, Poughkeepsie, NY (US); Janani Swaminathan, Tamil Nadu (IN); Gary Tressler, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/929,904

(22) Filed: Jun. 28, 2013

(65) Prior Publication Data

US 2015/0006785 A1 Jan. 1, 2015

(51) Int. Cl.
G06F 3/06 (2006.01)
(52) U.S. Cl.
CPC ............ *G06F 3/0611* (2013.01); *G06F 3/0655* (2013.01); *G06F 3/0679* (2013.01)
(58) Field of Classification Search
CPC .... G06F 3/0611; G06F 3/0655; G06F 3/0679
See application file for complete search history.

(56) References Cited

U.S. PATENT DOCUMENTS

| 7,181,588 | B2 | 2/2007 | Johnson et al. | |
| 8,151,020 | B2 | 4/2012 | Merry, Jr. et al. | |
| 8,547,996 | B2 | 10/2013 | Deutesfeld | |
| 2004/0236924 | A1* | 11/2004 | Johnson et al. | 711/173 |
| 2006/0143379 | A1* | 6/2006 | Khan et al. | 711/114 |
| 2008/0120441 | A1* | 5/2008 | Loewenstein | 710/22 |
| 2011/0004722 | A1 | 1/2011 | Jeddeloh | |
| 2012/0239859 | A1 | 9/2012 | Lary et al. | |
| 2014/0310443 | A1* | 10/2014 | Herbeck | 710/308 |

OTHER PUBLICATIONS

U.S. Appl. No. 14/301,185, entitled: "Transfer Size Monitor, Determination, and Optimization Engine for Storage Devices", filed Jun. 10, 2014.

U.S. Appl. No. 14/520,402, entitled: "Transfer Size Monitor, Determination, and Optimization Engine for Storage Devices", filed Oct. 22, 2014.

\* cited by examiner

*Primary Examiner* — Idriss N Alrobaye
*Assistant Examiner* — Ronald Modo
(74) *Attorney, Agent, or Firm* — Keivan Razavi; H. Daniel Schnurmann

(57) ABSTRACT

A method of dynamically varying transfer size in a storage device for improved performance may include receiving, by a processor, a plurality of data transfer parameters. The data transfer parameters may be compared against disk characterization data associated with a Solid State Disk, which is the target of a data transfer request. A data transfer size may be selected from the disk characterization data, based on the compared data transfer parameters. The data transfer request may be modified to use the selected data transfer size. The data transfer request is completed using the modified data transfer parameters.

12 Claims, 7 Drawing Sheets

DYNAMICALLY VARYING TRANSFER SIZE IN A STORAGE DEVICE FOR IMPROVED PERFORMANCE

FIELD

The present disclosure relates generally to the field of computer systems, and more particularly, to improving performance in solid state disk devices.

BACKGROUND

Solid State Disk (SSD) devices generally demonstrate advantages over Hard Disk Drives (HDD) because they are based on a semiconductor memory technology rather than on rotating mechanical media as in HDDs. SSDs generally exhibit lower latencies and faster response times. These characteristics offer higher throughput, especially for enterprise workloads such as data analytics that are Input/Output (I/O) intensive. Applications and operating systems may have some awareness of the characteristics of the data in I/O operations, and may be able to estimate through trial and error which set of data transfer parameters may improve throughput. However, optimizing disk performance typically is a reactive and re-iterative process that is based on historical measurements.

It may therefore be desirable, among other things, to proactively optimize disk performance by varying transfer sizes.

BRIEF SUMMARY

According to an aspect of the invention, a method for dynamically varying transfer size in a storage device may include receiving data transfer parameters for a Solid State Disk (SSD) device using a program, the program being executable by a processor of a computer; comparing the received data transfer parameters against disk characterization data associated with the SSD device; selecting a data transfer size from the disk characterization data associated with the SSD device based on the compared data transfer parameters; modifying the received data transfer parameters based on the selected data transfer size; and completing one or more Input/Output (I/O) operations with the SSD device using the modified data transfer parameters.

In another aspect of the invention, a computer program product for dynamically varying transfer size in a storage device may be provided. The computer program product may include a Transfer Size Determination and Optimization Engine (TSDOE) embodied on a computer readable storage medium. The TSDOE may include code executable by a processor to perform a method that may include receiving data transfer parameters for a Solid State Disk (SSD) device using a computer, the computer having a processor for executing a software program tool; comparing the received data transfer parameters against disk characterization data associated with the SSD device; selecting a data transfer size from the disk characterization data associated with the SSD device based on the compared data transfer parameters; modifying the received data transfer parameters based on the selected data transfer size; and completing one or more Input/Output (I/O) operations with the SSD device using the modified data transfer parameters.

In another aspect of the invention, a computer system for dynamically varying transfer size in a storage device is provided. The computer system may include one or more processors, one or more computer-readable storage devices, and a plurality of program instructions stored on at least one of the one or more storage devices for execution by at least one of the one or more processors. The plurality of program instructions may include program instructions to receive data transfer parameters for a Solid State Disk (SSD) using a program, the program being executable by a processor of a computer; program instructions to compare the received data transfer parameters against the disk characterization data associated with the SSD device; program instructions to select a data transfer size from the disk characterization data associated with the SSD device based on the compared data transfer parameters; program instructions to modify the received data transfer parameters based on the selected data transfer size; and program instructions to complete one or more Input/Output (I/O) operations using the modified data transfer parameters.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
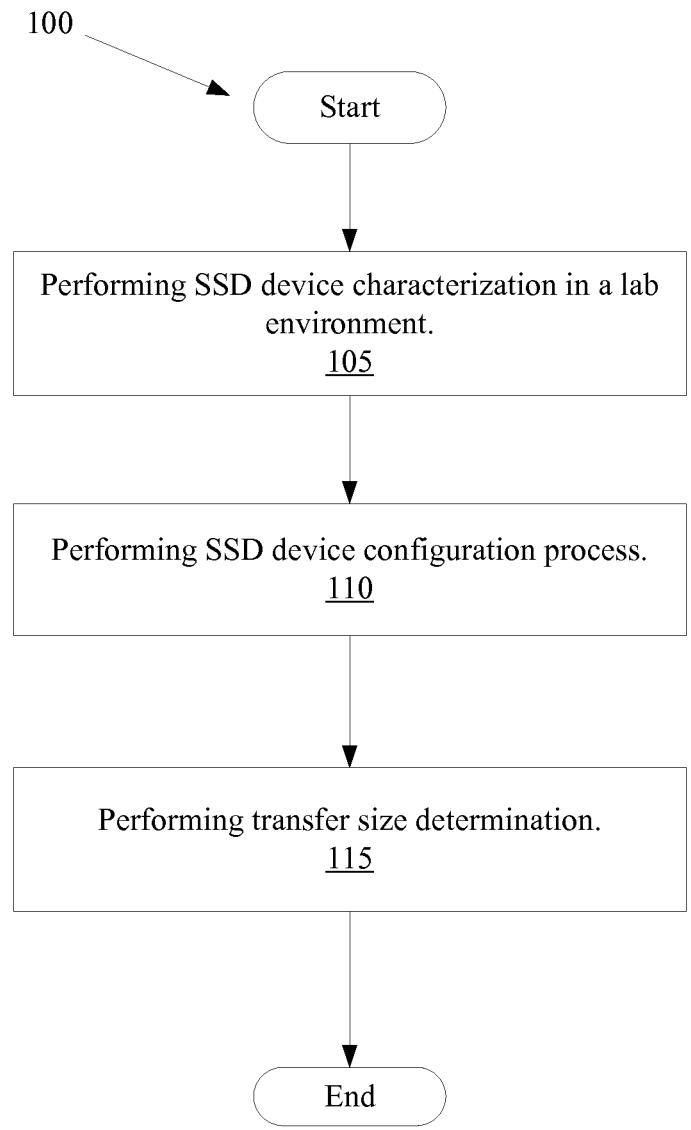
FIG. 1 is a flow chart illustrating an overview of an exemplary embodiment of a method of dynamically varying transfer size in a storage device.
Figure 6:
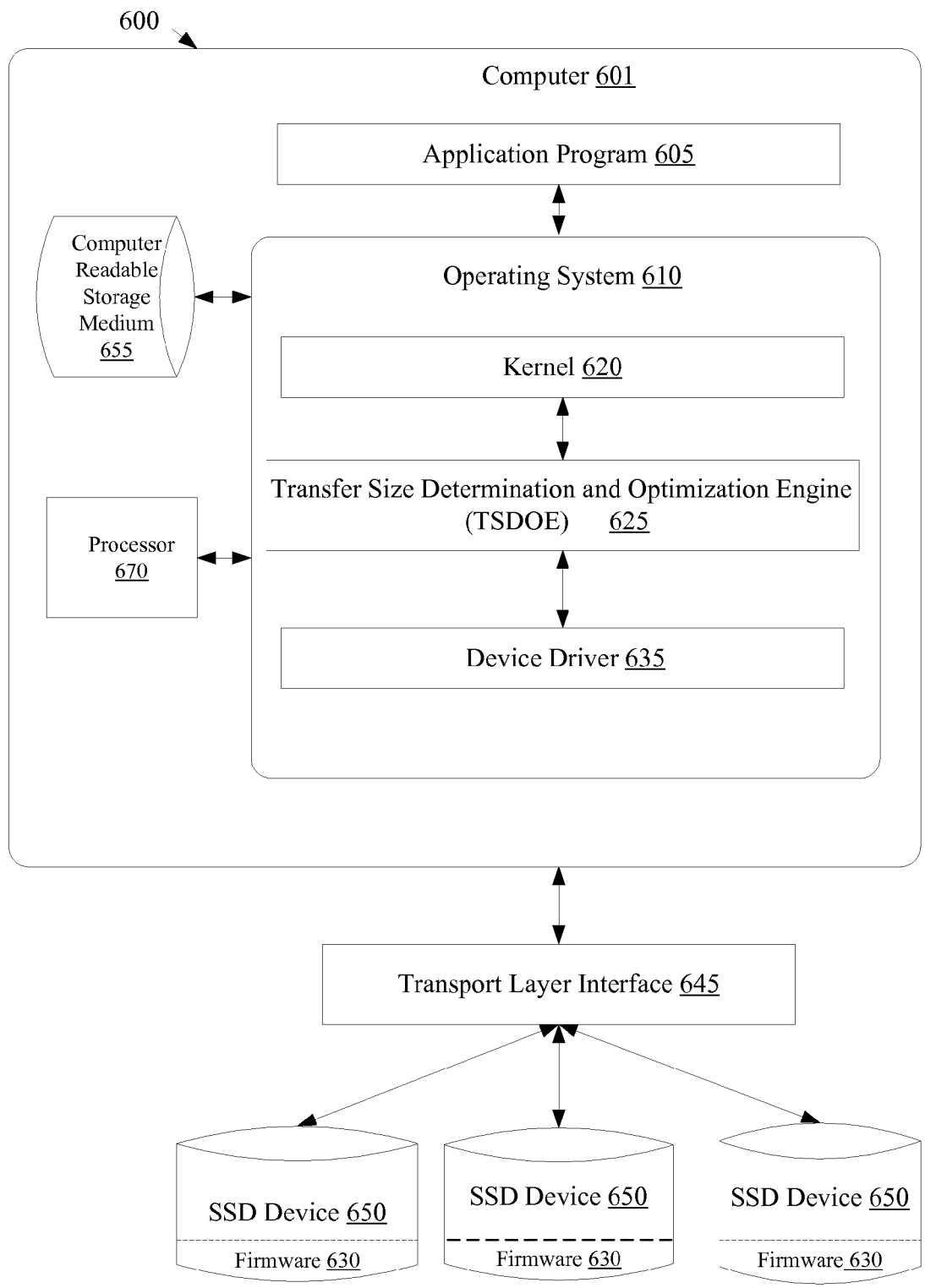
FIG. 6 is a schematic block diagram of a computing software environment utilizing the embodiments of FIGS. 1-4.

Referring to FIGS. 1 and 6, according to an embodiment of the disclosure, a method 100 and system 600 analyze and may improve data transfer performance when using Solid State Disk (SSD) devices.

As depicted in FIG. 6, the system 600 may include a computer 601, one or more processors 670, and a plurality of SSD devices 650 communicating with the computer 601 through a Transport Layer Interface (TLI) 645 protocol, such as Fibre Channel. The plurality of SSD devices 650 each include firmware 630, which may act as a control program for each respective device. The computer 601 may further include an application program 605 which may be stored on the computer readable storage medium 655, and which may execute on the one or more processors 670. Within the computer 601, an operating system 610 includes specialized instructions for the management of the hardware and software components of the computer 601 such as, for example, those of the computer environment shown as 700 in FIG. 7. The kernel 620 component of the operating system 610 includes management of the low-level communications between the hardware and software components, also called the abstraction layer. The kernel 620 may also contain other operating system 610 subcomponents, such as a device table (not shown) which defines the devices connected to the computer 601 and their characteristics. The operating system 610 may further consist of one or more device drivers 635, each of which may be installed to control a particular type of device, such as the plurality of SSD devices 650 that are attached to the computer 601. Other software programs may be installed in the computer 601 that may supplement and extend the functionality of the operating system 610. For example, a Transfer Size Determination and Optimization Engine (TSDOE) 625 may analyze and optimize the I/O requests between another software layer, such as the application program 605, and a device such as a SSD device 650. The TSDOE 625 may be supplied in one of several platform-dependent formats, such as, for example, a package in Linux, and may be installed using standard operating system specific procedures, such as RPM, the Linux software install program.

Referring now to FIG. 1, 105 represents the start of the method 100. As discussed in FIG. 2 below, the SSD device 650 may undergo analytical lab characterization to determine its performance metrics (105). At 110, and further discussed in FIG. 3 below, the operating system 610 configures the SSD device 650 for use by the computer 601. At 115, the TSDOE 625, as further discussed in FIG. 4 below, may intercept and optimize one or more data transfer requests to the SSD device 650.

Figure 2:
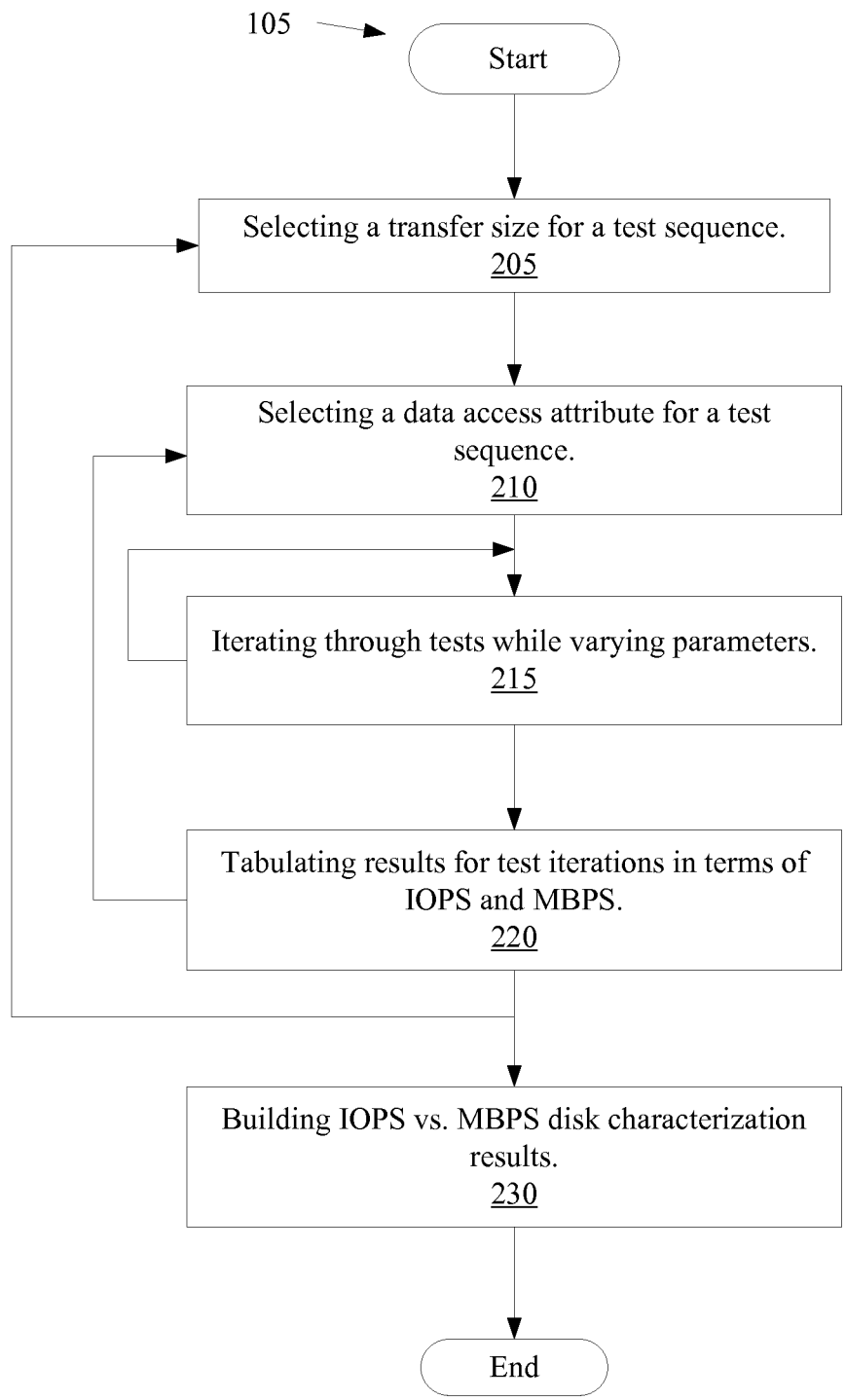
FIG. 2 is a flow chart illustrating an exemplary embodiment of a method of using a variety of workloads to analyze the performance metrics of a SSD device.

Referring now to FIG. 2, the reference numeral 105 generally designates a flow chart illustrating a method of using a variety of workloads to analyze the performance metrics of a SSD device 650 for device characterization processes. At 205 a predetermined workload executes to determine and collect a plurality of performance metrics describing the SSD device 650. In designing the workload, the SSD device 650 may be isolated from the underlying computer platform, including other hardware or software components, so that the SSD device 650 is the only limiting variable in the test. The workload may consist of one or more industry-standard performance test suites, such as a latency test, a throughput test, or a write saturation test. In another embodiment, the workload may incorporate feedback data that the TSDOE 625 may collect during customer operation, for example, where the TSDOE 625 determines that the observed performance metrics are not comparable against the disk characterization data produced from the previous workload. Thus, the disk characterization process may continuously improve the accuracy of the disk characterization data.

The following discussion of exemplary performance metrics is presented as an illustration of, and not a limitation on, possible data that a disk characterization workload may be designed to capture.

Latency, which is one exemplary SSD device performance metric, represents an average of the time required to complete a predetermined profile of read commands, write commands, or a mixture of both. Latency may vary depending upon, among other factors, the size of the data (e.g., 4 kilobytes (KB) or 256 KB) and the degree of randomness of the data access. The mixture of read commands versus write commands in a workload may likewise affect SSD latency.

Data entropy, which is another exemplary metric in SSD performance, may be described as the randomness exhibited by the data, itself, and may be further described in terms of compressibility of the data. Purely random data, such as video, may not be compressible because the randomness does not follow a probability distribution that compression algorithms may model. Similarly, data that is already compressed, as well as encrypted data, have the redundancy patterns removed, rendering these two data types incompressible. In summary, the lower the entropy, the more redundant and compressible the data. However, the higher the entropy, the less redundant and compressible the data.

Queue depth is another exemplary performance metric that may be included in the disk characterization workload. Queue depth generally may be referred to as a number of Input/Output (I/O) operations queued to a disk drive. Increasing queue depth may improve I/O throughput performance. However, an increase in latency may result as a trade-off.

Write amplification is an exemplary metric that occurs where, due to the architectural characteristics of SSD technology, the physical amount of data written exceeds the logical I/O request. Generally, the flash storage component of a SSD is constructed in pages, such as 8 KB, that are organized in blocks of, for example 256 KB. In SSD technology, data is not directly overwritten, but is only marked for later deletion, an operation that occurs at the block level. Therefore, over time, data in a file may become increasingly fragmented and spread over several blocks. To support the I/O profile of an application, it may be necessary to relocate data within the blocks. The process includes mapping and updating the location of the data within the blocks, then erasing the affected blocks. Therefore, an I/O request to write 4 KB of data may result in movement of up to an entire 256 KB block, resulting in a write amplification factor of 64 to 1 (256 KB/4 KB).

At 205, a transfer size for a test sequence may be selected. For example, the SSD device 650 may be purged and preconditioned prior to beginning a test sequence of a given selected transfer size, such as, for example, 4 KB. Initially, a new and previously unused SSD device may exhibit a period of elevated performance because all blocks are equally available, and random updates and deletions have yet to contribute to fragmentation. However, following the completion of a test sequence, a purge process advantageously returns the SSD device 650 to its original state, effectively erasing the existing data. During preconditioning, a prescribed workload may be executed on the SSD device 650 to set any prerequisite conditions for the next test sequence.

At 210, a data access attribute, such as sequential or random may be selected for a particular test sequence. At 215, the test sequence may iterate for each of a plurality of parameters such as, for example, entropy, read/write percentage, queue depth, and compressibility of the data. When at 220 the test iterations over the plurality of parameters is complete for the given transfer size (205), a table of results representing I/O Operations per Second (IOPS), and Megabits per Second (Mb/s) is created for the transfer size, data access attributes, and plurality of parameters input to the disk characterization process. The sequence 205, 210, 215, and 220 may repeat for each transfer size selected at 205.

Figure 5:
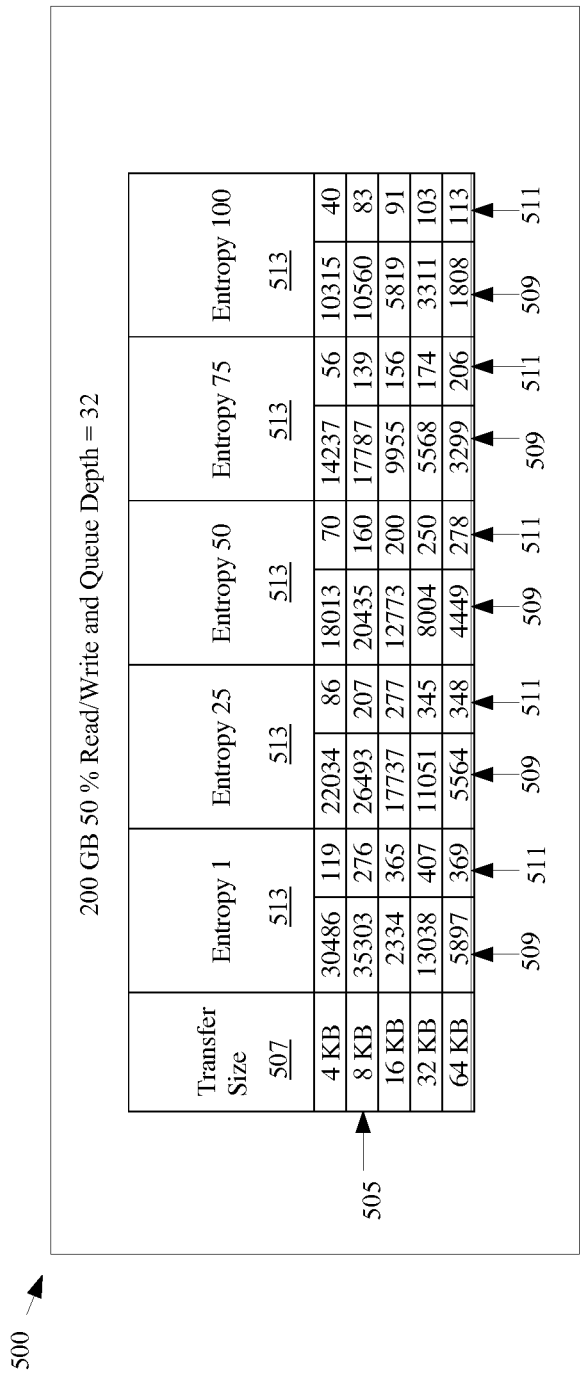
FIG. 5 is a table illustrating a sampling of disk characterization data used in determining a preferred data transfer size, according to one exemplary embodiment.

Following the completion of the test sequences for each of the transfer sizes, at 230 the resulting performance metrics of the SSD device 650 are aggregated as disk characterization data. FIG. 5 shows exemplary disk characterization data for a 200 Gigabyte (GB) SSD device 650, formatted as a table to facilitate viewing the data. Referring to FIG. 5, the input test parameters include a 50% ratio of read to write operations, a queue depth of "32" pending I/O operations, and a variety of entropies 513 for each of a range of transfer sizes 507. The IOPSs 509 and Mb/s 511 represent the calculated throughput values for the various combinations of parameters and transfer sizes that were tested. The disk characterization data may be supplied on the SSD device 650 (FIG. 6) as firmware 630 (FIG. 6), or as separate software that may be installed by the operating system 610 (FIG. 6). In another embodiment, the exemplary disk characterization method 105 (FIG. 2) may constitute a part of a vendor's ongoing product maintenance schedule. Product maintenance that includes disk characterization data may be supplied as updates to the firmware 630, the device driver 635 (FIG. 6), or the operating system 610. As part of applying the product maintenance, the operating system 610 may dynamically update its existing copy of the disk characterization data, thereby keeping a SDD device 650 that is in service on a computer 601 current.

Figure 3:
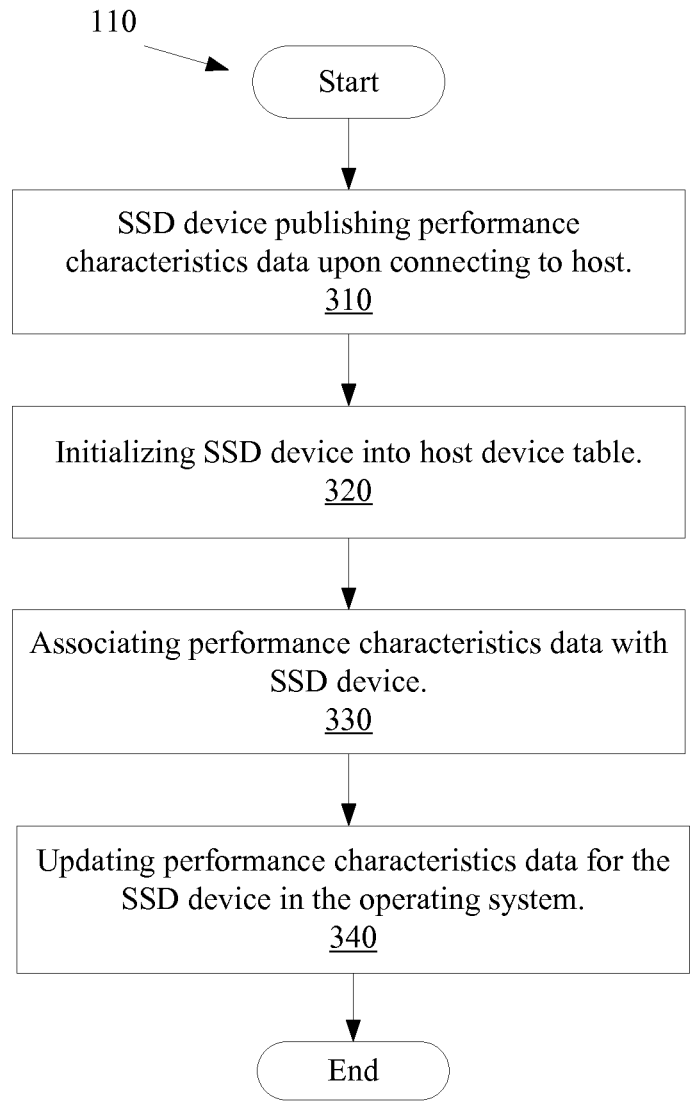
FIG. 3 is a flow chart illustrating an exemplary embodiment of a method of adding the disk characterization data developed in FIG. 2 to a computer when installing a SSD device.

Referring now to FIG. 3, the reference numeral 110 generally designates a flow chart illustrating a method of adding the disk characterization data to the computer 601 when the SSD device 650 is installed. In general, when a device is initially connected to a computer, the operating system uses specialized program instructions to add the device to a table of devices known to the operating system. In operation, at 310 when the SSD device 650 is first connected to the computer 601, the SSD device 650 reports its identifying characteristics to the operating system 610. Identifying characteristics may include for example, a device type, a vendor identifier, a product identifier, a serial number, a capacity (i.e., in GB of data), associated device driver software, and a list of commands and other functions known to the device. At 320, the operating system 610 invokes a platform-specific configuration method to generate a unique device identifier for the SSD device 650, and to build an entry for the SSD device 650 in the operating system 610 device table which may reside in, for example, storage medium 655 or operating system 610 memory. As part of the device configuration process, the operating system 610 installs the disk characterization data associated with the SSD device 650 to a location accessible to the TSDOE 625. At 330, the disk characterization data entries for all the SSD devices 650 may be organized for efficient access as a database, an array, a linked list, or in another format suitable for storing similar types of data. Thus, the TSDOE 625 may process simultaneous data transfer requests for a plurality of SSD devices 650.

In addition to a predetermined workload, the disk characterization process described above in FIG. 2 may incorporate feedback data that the TSDOE 625 may collect during customer operation, especially where the TSDOE 625 determines that the observed performance metrics are not comparable against the disk characterization data produced from the previous workload. This may occur, for example, where no disk characterization data was supplied with an installed SSD device 650, or where a lack of granularity in the disk characterization data resulted in the TSDOE 625 frequently choosing default values. At 340, a vendor may supply updated disk characterization data throughout the lifecycle of the SSD device 650. An administrator of the computer system may install the updates using a platform-specific procedure similar to that used when adding maintenance to an operating system. Upon installation, the operating system 610 dynamically updates its existing copy of disk characterization data, making the updated version promptly available to the TSDOE 625. Thus, the TSDOE 625 and the computer 601 can transparently respond to the latest nuances and features of the SSD device 650 with improved transfer size granularity.

Figure 4:
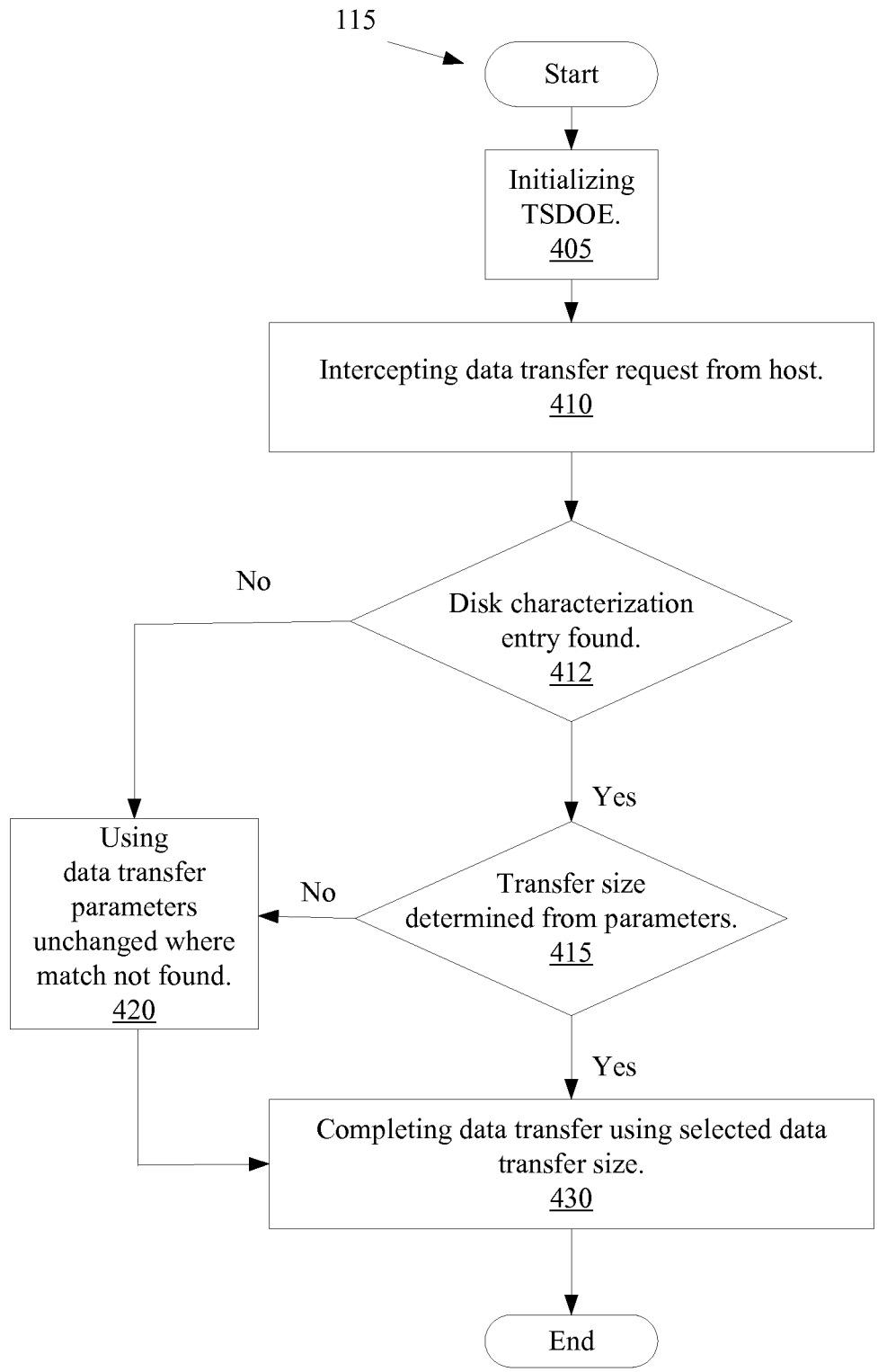
FIG. 4 is a flow chart illustrating a method of determining a preferred data transfer size for improved performance, according to one exemplary embodiment.

Referring now to FIG. 4, the reference numeral 115 generally designates a flow chart illustrating a method of determining a preferred data transfer size for improved performance. At 405 the TSDOE 625 software may be installed using a standard operating system specific program, such as RPM (Linux). Following initialization, the TSDOE 625 accesses the location where the operating system 610 installed the disk characterization data during the device configuration process of FIG. 3 and then begins operation.

At 410, the TSDOE 625 may intercept and parse data transfer requests that originated in various layers in the software stack and identify a SSD device 650 as the target. For example, a user application program 605 may request to read a 4 KB block of data by specifying the name of the file where the data is stored. The operating system 610 may associate the file name and the data transfer request with the SSD device 650, then package the data transfer request and its associated parameters into a structure, referred to as a control block (not shown). The associated parameters may include, for example, the seek capability of the data (e.g., random or sequential), the amount of data to transfer, the number of threads processing the data, and the compressibility of the data. A next layer, such as the kernel 620, receives the control block and may then add to or modify the parameters in the control block, for example to satisfy parameter passing requirements between component layers. Before reaching the device driver 635 for the SSD device 650, the TSDOE 625 may intercept the control block and extract parameters that uniquely identify the SSD device 650, such as for example, an operating system-generated device identifier, a vendor identifier, a product identifier, and/or a serial number, to search the plurality of disk characterization data entries for an entry associated with the SSD device 650.

If at 412 no matching entry is found, for example where the disk characterization data is corrupted, or where no disk characterization data was provided for the SSD device 650, then at 420 the TSDOE 625 may pass the data transfer request (i.e., default parameters) unchanged to the device driver 635 for the SSD device 650 for completion at 430.

Where at 412, a disk characterization data entry corresponding to the SSD device 650 is found, the TSDOE 625 may parse the contents of the control block for parameters describing the data transfer request, such as a transfer size and whether the request is to read or write. The TSDOE 625 may then determine an optimized transfer size 507 based on the extracted data transfer parameters and the disk characterization data. For example, the TSDOE 625 may parse the control block and determine that data is to be read from the 200G SSD device having the disk characterization data depicted in FIG. 5. Based on the disk characterization data (FIG. 5), the TSDOE 625 may determine that an 8 KB transfer size is likely to provide an optimized throughput in terms of TOPS 509 and Mb/s 511 in comparison to the 4 KB transfer size originally requested by the application program 605. The TSDOE 625 may modify the data transfer request to use the new data transfer value (e.g., 8 KB) and at 430 pass the modified data transfer request (e.g., 8 KB) to the device driver 635 for the SSD device 650 for completion.

However, if at 415 an optimized transfer size 507 cannot be determined from the data transfer parameters, such as, for example, where one or more parameters is missing from the data transfer request, the TSDOE 625 may attempt to intelligently substitute a value for the missing parameter based on the available data transfer parameters. Where no substitution is feasible, at 420 the TSDOE 625 may pass the data transfer request unchanged to the device driver 635 for the SSD device 650 for completion at 430.

Figure 7:
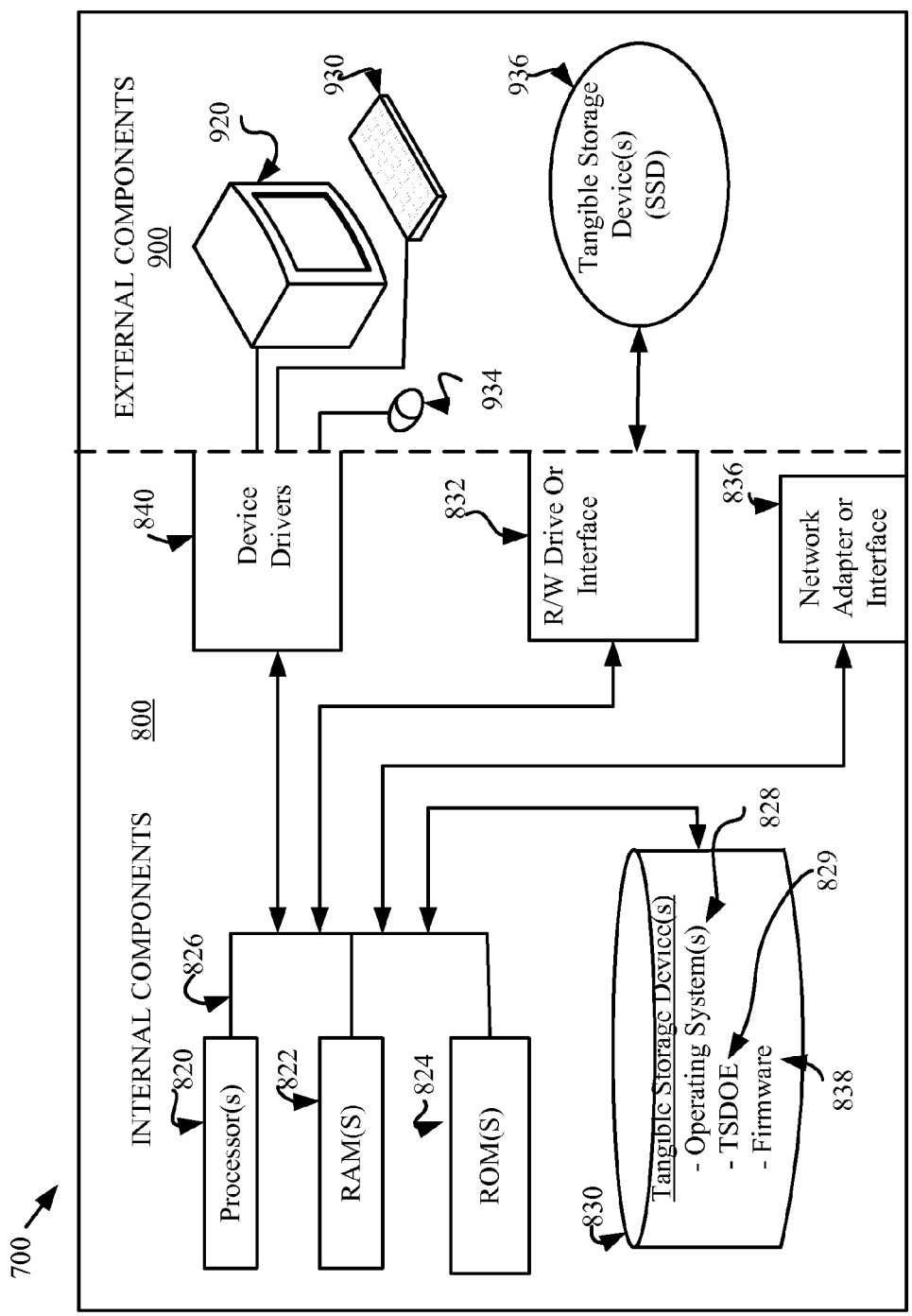
FIG. 7 is a block diagram of hardware and software of the computer environment of FIG. 6 according to an embodiment of the present invention.

Referring now to FIG. 7, computing device 700 may include respective sets of internal component 800 and external components 900. Computer 601 (FIG. 6) may include the respective sets of internal component 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., TSDOE 829); and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The firmware 838 and operating system 828 that are associated with computing device 700, can be downloaded to computing device 700 from an external computer (e.g., server) via a network (for example, the Internet, a local area network or other, wide area network) and respective network adapters or interfaces 836. From the network adapters (or switch port adaptors) or interfaces 836, the firmware 838 and operating system 828 associated with computing device 700 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-7 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of dynamically varying transfer size in a storage device comprising:
    receiving data transfer parameters for a Solid State Disk (SSD) device using a program, the program being executable by a processor of a computer, wherein the data transfer parameters include a SSD device identifier, entropy, sequential access, random access, queue depth, compressibility, and read/write percentage;
    comparing the received data transfer parameters against disk characterization data associated with the SSD device;
    selecting a data transfer size from the disk characterization data associated with the SSD device based on the compared data transfer parameters;
    modifying the received data transfer parameters based on the selected data transfer size and adding a default value to the received data transfer parameters where a parameter value is missing from the received data transfer parameters; and
    completing one or more Input/Output (I/O) operations with the SSD device using the modified data transfer parameters.

2. The method of claim 1, wherein comparing the received data transfer parameters further comprises:
    extracting the SSD device identifier from the received data transfer parameters;
    searching a plurality of disk characterization data entries for an entry corresponding to the SSD device using the SSD device identifier; and
    selecting the disk characterization data associated with the SSD device.

3. The method of claim 1, wherein selecting a data transfer size further comprises:
    matching the received data transfer parameters with the disk characterization data corresponding to the SSD device;
    providing the default value to the received data transfer parameters where a parameter value is missing from the received data transfer parameters; and
    selecting the data transfer size from the disk characterization data corresponding to the SSD device based on the compared received data transfer parameters including the provided default value.

4. The method of claim 1, wherein modifying the received data transfer parameters further comprises:
    copying the selected data transfer size from the disk characterization data corresponding to the SSD device to the received data transfer parameters.

5. A computer program product for dynamically varying transfer size in a storage device, the computer program product including a Transfer Size Determination and Optimization Engine (TSDOE) embodied on a non-transitory machine-readable storage medium, the TSDOE including code executable by a processor to perform a method comprising:
    receiving data transfer parameters for a Solid State Disk (SSD) device using a computer, the computer having a processor for executing a software program tool, wherein the data transfer parameters include a SSD device identifier, entropy, sequential access, random access, queue depth, compressibility, and read/write percentage;
    comparing the received data transfer parameters against disk characterization data associated with the SSD device;
    selecting a data transfer size from the disk characterization data associated with the SSD device based on the compared data transfer parameters;
    modifying the received data transfer parameters based on the selected data transfer size and adding a default value to the received data transfer parameters where a parameter value is missing from the received data transfer parameters; and
    completing one or more Input/Output (I/O) operations with the SSD device using the modified data transfer parameters.

6. The computer program product of claim 5, wherein comparing the received data transfer parameters further comprises:
    extracting a SSD device identifier from the received data transfer parameters;
    searching a plurality of disk characterization data entries for an entry corresponding to the SSD device using the SSD device identifier; and
    selecting the disk characterization data associated with the SSD device.

7. The computer program product of claim 5, wherein selecting a data transfer size further comprises:
    matching the received data transfer parameters with the disk characterization data corresponding to the SSD device;
    providing a default value to the received data transfer parameters where a parameter value is missing from the received data transfer parameters; and
    selecting the data transfer size from the disk characterization data corresponding to the SSD device based on the comparing of the received data transfer parameters including the default value.

8. The computer program product of claim 5, wherein modifying the received data transfer parameters further comprises:
   copying the selected data transfer size from the disk characterization data corresponding to the SSD device to the received data transfer parameters.

9. A computer system for dynamically varying transfer size in a storage device, the computer system comprising one or more processors, one or more computer- readable storage devices, and a plurality of program instructions stored on at least one of the one or more computer-readable storage devices for execution by at least one of the one or more processors, the plurality of program instructions comprising:
   program instructions to receive data transfer parameters for a Solid State Disk (SSD) using a program, the program being executable by a processor of a computer, wherein the data transfer parameters include a SSD device identifier, entropy, sequential access, random access, queue depth, compressibility, and read/write percentage;
   program instructions to compare the received data transfer parameters against the disk characterization data associated with the SSD device;
   program instructions to select a data transfer size from the disk characterization data associated with the SSD device based on the compared data transfer parameters;
   program instructions to modify the received data transfer parameters based on the selected data transfer size and adding a default value to the received data transfer parameters where a parameter value is missing from the received data transfer parameters; and
   program instructions to complete one or more Input/Output (I/O) operations using the modified data transfer parameters.

10. The computer system of claim 9, wherein comparing the received data transfer parameters further comprises:
    extracting the SSD device identifier from the received data transfer parameters;
    searching a plurality of disk characterization data entries for an entry corresponding to the SSD device using the SSD device identifier; and
    selecting disk characterization data associated with the SSD device.

11. The computer system of claim 9, wherein selecting a data transfer size further comprises:
    matching the received data transfer parameters with the disk characterization entry corresponding to the SSD device;
    providing the default value where the parameter value is missing from the received data transfer parameters; and
    selecting the data transfer size from the disk characterization data corresponding to the SSD device based on the comparing of the received data transfer parameters including the default value.

12. The computer system of claim 9, wherein modifying the received data transfer parameters further comprises:
    copying the selected data transfer size from the disk characterization data corresponding to the SSD device to the received data transfer parameters.

* * * * *